US011423414B2

(12) United States Patent
Zoldi et al.

(10) Patent No.: US 11,423,414 B2
(45) Date of Patent: Aug. 23, 2022

(54) ADVANCED LEARNING SYSTEM FOR DETECTION AND PREVENTION OF MONEY LAUNDERING

(71) Applicant: FAIR ISAAC CORPORATION, San Jose, CA (US)

(72) Inventors: Scott Michael Zoldi, San Diego, CA (US); Joseph F. Murray, San Diego, CA (US)

(73) Assignee: FAIR ISAAC CORPORATION, San Jose, CA (US)

( * ) Notice: Subject to any disclaimer, the term of this patent is extended or adjusted under 35 U.S.C. 154(b) by 1083 days.

(21) Appl. No.: 15/074,977

(22) Filed: Mar. 18, 2016

(65) Prior Publication Data

US 2017/0270534 A1 Sep. 21, 2017

(51) Int. Cl.
*G06Q 30/00* (2012.01)
*G06Q 20/40* (2012.01)
(Continued)

(52) U.S. Cl.
CPC ..... *G06Q 30/018* (2013.01); *G06F 16/24578* (2019.01); *G06F 16/9535* (2019.01);
(Continued)

(58) Field of Classification Search
CPC .. G06Q 30/018; G06Q 20/4016; G06Q 50/26; G06N 20/00; G06F 16/9535; G06F 16/24578; H04L 67/22; H04L 67/306
See application file for complete search history.

(56) References Cited

U.S. PATENT DOCUMENTS

2006/0294095 A1* 12/2006 Berk ................. G06Q 10/04
2009/0307049 A1* 12/2009 Elliott, Jr. ............ G06Q 40/00
705/7.29
(Continued)

FOREIGN PATENT DOCUMENTS

WO    WO-2011068797 A1 *  6/2011 ......... G06Q 20/4016

OTHER PUBLICATIONS

Rajaraman, Anand, and Jeffrey David Ullman. Mining of massive datasets. Cambridge University Press, 2011 (Year: 2011).*
(Continued)

*Primary Examiner* — Bennett M Sigmond
*Assistant Examiner* — James H Miller
(74) *Attorney, Agent, or Firm* — Mintz Levin Cohn Ferris Glovsky and Popeo, P.C.; F. Jason Far-hadian, Esq.

(57) ABSTRACT

An automated system for detecting risky entity behavior using an efficient frequent behavior-sorted list is disclosed. From these lists, fingerprints and distance measures can be constructed to enable comparison to known risky entities. The lists also facilitate efficient linking of entities to each other, such that risk information propagates through entity associations. These behavior sorted lists, in combination with other profiling techniques, which efficiently summarize information about the entity within a data store, can be used to create threat scores. These threat scores may be applied within the context of anti-money laundering (AML) and retail banking fraud detection systems. A particular instantiation of these scores elaborated here is the AML Threat Score, which is trained to identify behavior for a banking customer that is suspicious and indicates high likelihood of money laundering activity.

23 Claims, 5 Drawing Sheets

(51) Int. Cl.
  *G06Q 50/26*     (2012.01)
  *H04L 67/306*    (2022.01)
  *G06N 20/00*     (2019.01)
  *G06F 16/9535*   (2019.01)
  *G06F 16/2457*   (2019.01)
  *H04L 67/50*     (2022.01)

(52) U.S. Cl.
  CPC ......... *G06N 20/00* (2019.01); *G06Q 20/4016* (2013.01); *G06Q 50/26* (2013.01); *H04L 67/22* (2013.01); *H04L 67/306* (2013.01)

(56) References Cited

U.S. PATENT DOCUMENTS

| | | | |
|---|---|---|---|
| 2010/0036672 A1* | 2/2010 | Li | G06Q 10/0639 |
| | | | 705/7.11 |
| 2010/0228580 A1* | 9/2010 | Zoldi | G06Q 10/10 |
| | | | 707/E17.014 |
| 2012/0101937 A1* | 4/2012 | Zoldi | G06Q 40/12 |
| | | | 705/38 |
| 2013/0339186 A1* | 12/2013 | French | G06F 21/577 |
| | | | 705/26.35 |
| 2014/0279640 A1* | 9/2014 | Moreno | G07C 9/22 |
| | | | 705/325 |
| 2014/0310159 A1* | 10/2014 | Zoldi | G06Q 20/4016 |
| | | | 705/39 |

OTHER PUBLICATIONS

Tang, Fang, "CS240 Lecture Notes on Recursion," https://www.cpp.edu/~ftang/courses/CS240/lectures/recursion.htm (Year: 2013).*
Dr. Daisy Fang's Home Page https://www.cpp.edu/~ftang/ (Year: 2017).*
Course Syllabus CS240 https://www.cpp.edu/~ftang/courses/CS240/ (Year: 2016).*
Leskovec, Jure, Anand Rajaraman, and Jeffrey David Ullman. "Mining of Massive Datasets." (2014) (Year: 2014).*

* cited by examiner

ADVANCED LEARNING SYSTEM FOR DETECTION AND PREVENTION OF MONEY LAUNDERING

TECHNICAL FIELD

The subject matter described herein relates to computer-based machine learning systems and methods, and more particularly to advanced learning systems and methods for detection and prevention of money laundering.

BACKGROUND

Money laundering is a term given to a process of taking funds from an illicit activity and manipulating them through the financial system such that they appear to be from a different and legitimate source. Money laundering is a complex, worldwide problem, with estimates of $800B to $2 T USD being laundered every year. Laundering typically includes three steps: (1) placement, where the illicit funds are first introduced to the financial system; (2) layering, where the illicit funds are combined through multiple transactions with legitimate sources; and (3) integration, where the illicit funds are returned to the launderer through seemingly legitimate transactions.

Money laundering occurs through a wide variety of financial products and access channels, including current accounts (EFT/ACH/SWIFT, wire, check, cash), loans, investment products, credit cards (purchases, returns, over payments) and debit cards (traditional and pre-paid). A recent proliferation of technologies, from mobile payments to cryptocurrencies, has increased the difficulty of finding a comprehensive solution.

Traditional approaches to create anti-money laundering (AML) solutions have focused on rules-based systems to meet specific regulatory requirements. For example, the US Bank Secrecy Act of 1970 required enhanced reporting of transactions exceeding $10,000. However, basic rules like these were easily circumvented by breaking up large transactions into smaller amounts that would avoid triggering such rules.

Modern detection systems, such as fraud detection systems, rely on training data for supervised or semi-supervised machine learning methods to improve analysis of activities or transactions to detect targeted behaviors or actions. The better the training data, the more accurate and efficient the detection system. Some regulations require that Suspicious Activity Reports (SARs) be filed in cases with sufficient suspicion of wrong-doing. SARs are quite rare, so one of the main challenges for supervised learning is the highly unbalanced nature of the classes. The incorporation of certain semi-supervised techniques can help address this issue. While traditional AML systems create a high-volume of alerts, only a small fraction of these alerts will be investigated and lead to a SAR filing with regulators. Accordingly, what is needed is a system and method to prioritize alerts, to determine those cases with the highest likelihood of laundering activity, and to link alerts with SARs to develop a robust source of training data for supervised or semi-supervised machine learning methods and systems for detection of money laundering.

SUMMARY

This document describes an automated system for detecting risky entity behavior using an efficient frequent behavior-sorted list. From these lists, fingerprints and distance measures can be constructed to enable comparison to known risky entities. The lists also facilitate efficient linking of entities to each other, such that risk information propagates through entity associations. These behavior sorted lists, in combination with other profiling techniques, which efficiently summarize information about the entity within a data store, can be used to create threat scores. These threat scores may be applied within the context of anti-money laundering (AML) and retail banking fraud detection systems. A particular instantiation of these scores elaborated herein is the AML Threat Score, which is trained to identify behavior for a banking customer that is suspicious and indicates high likelihood of money laundering activity In one aspect methods having one or more operations, non-transitory computer program products storing instructions that, when executed by at least one programmable processor, cause the at least one programmable processor to perform operations, and systems comprising at least one programmable processor and a machine-readable medium storing instructions that, when executed by the at least one processor, cause the at least one programmable processor to perform operations is described.

The operations can include creating one or more profiles for an entity of interest. Each profile can be formed as a data structure that captures statistics of the entity's behavior without storing a record of past activity of the entity. Each profile can comprise a plurality of behavior sorted lists and recursive features. Each behavior sorted list can be formed of a tuple of entries. Each entry can be a key, a weight, a payload that represent a frequently-observed behavior of the entity, or the like. The recursive features can be configured to summarize the frequently-observed behavior of each profile.

The operations can include storing the one or more profiles in a data store. For each input data record associated with the entity of interest one or more relevant profiles can be retrieved from the data store. The one or more relevant profiles can be updated to recursively compute summary statistics of behavior of the entity by adding or updating an observed behavior represented by the input data record to at least one of the plurality of behavior sorted lists with a full weight while decaying the weights of existing observed behaviors.

The elements can be compared between at least two of the plurality of behavior sorted lists to generate a numerical value representing a consistency between entries in the behavior sorted list of the entity and that of other entities including risky entities and those associated behavior sorted list entries.

One or more distance models, to the plurality of behavior sorted lists, can be executed to determine a variation of the consistency between the entries in the at least two behavior sorted lists according to the numerical value.

An anti-money laundering threat score can be generated. The anti-money laundering threat score can be generated utilizing self-calibrating outlier models based on entity recursively summarized profile behavior, recurrences in an entities behavior sorted list. The anti-money laundering threat score can be based on the variation of matches on behavior sorted lists of risk entities. The anti-money laundering threat score can represent a threat risk that the entity of interest is engaged in money laundering.

In some variations, the payload of at least one entry of the one or more profiles includes recursive features. The payload of at least one entry of the one or more profiles can include archetype distributions, derived archetype profile features, soft clustering misalignment scores, and/or the like.

The input data record is a transaction performed by the entity of interest.

Storing the one or more profiles in a data store can comprise storing the one or more profiles as an account on a server that is part of a cloud-based network of servers.

In some variations, two or more accounts can be linked from the cloud-based network of servers. The risk level can be associated with the linkage of accounts and can reflect using the threat scores across the linked list of accounts. A degradation of a set of anti-money laundering threat scores can be determined. One or more outlier detection models can be retrained based on the degradation and/or using one or more auto-retraining mechanisms.

In some variations, a set of global profiles can be generated. The set of global profiles can represent a population of entities of interest.

Implementations of the current subject matter can include, but are not limited to, systems and methods consistent with one or more features described herein, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
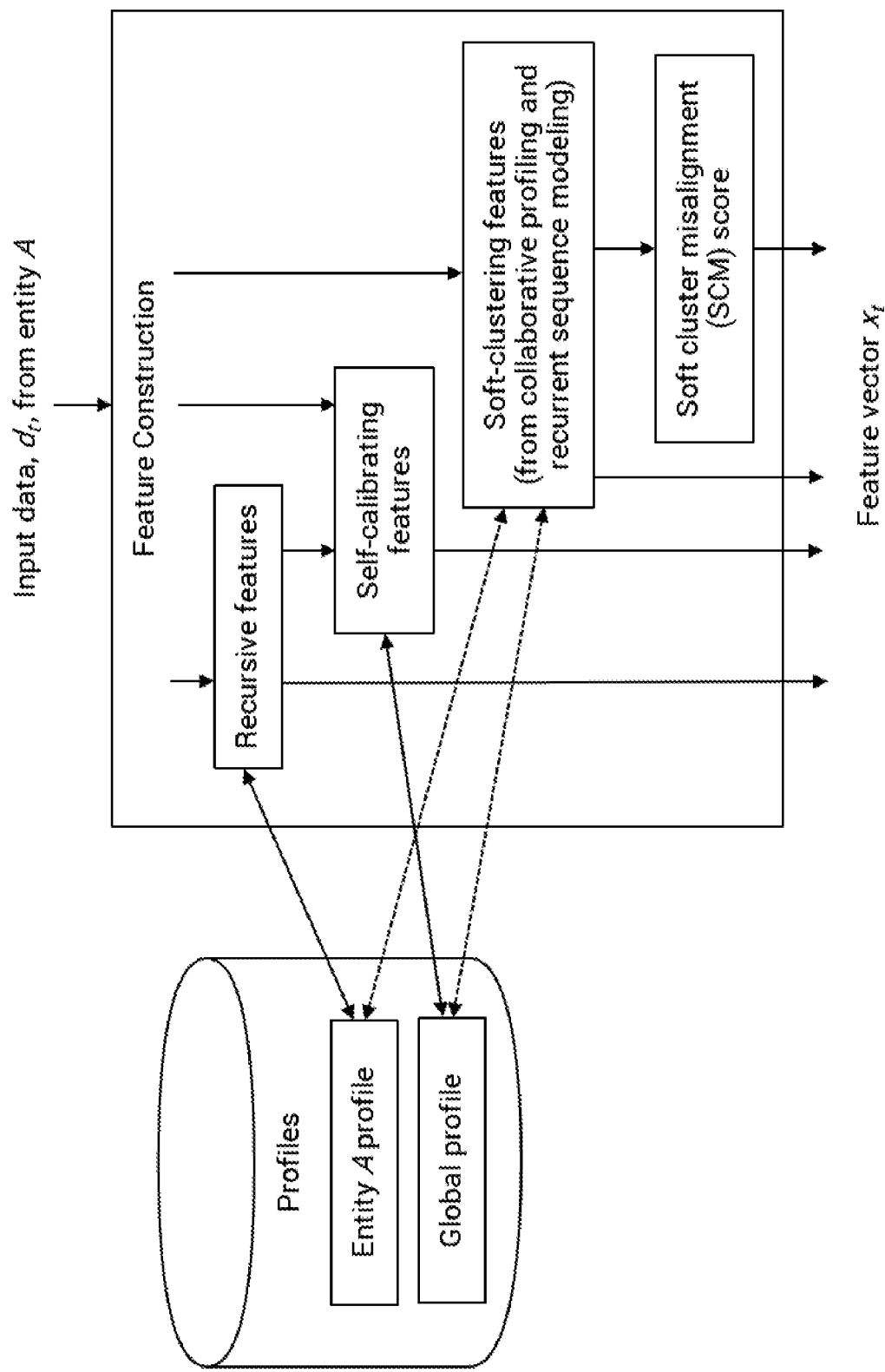
FIG. 1 shows the components of the feature construction module and their interactions with the profile stores.

To address these and potentially other issues with currently available solutions, methods, systems, articles of manufacture, and the like consistent with one or more implementations of the current subject matter can, among other possible advantages, provide a set of modules for learning entity behavior, and which can combined into an AML Threat Score system. In some implementations, a system captures many aspects of customer and account behavior in order to alert financial institutions to activity that is similar to observed money laundering activity, or which is suspiciously anomalous for that entity based on its prior history and peer groups.

The AML Threat Score (or "score") makes use of profiles to efficiently summarize past behavior in a data store, while minimizing the storage and lookup requirements on that data store. The score also makes use of self-calibrating technologies to adapt to dynamic real-world conditions, e.g., macroeconomic factors such as currency fluctuation. The score can also make use of soft-clustering misalignment (SCM) technologies such as collaborative profiling and recurrent sequence modeling which compare behavior across clusters and through sequences, as described in co-pending U.S. patent application Ser. No. 15/074,856, filed Mar. 18, 2016, and entitled "Behavioral Misalignment Detection within Entity Hard Segmentation utilizing Archetype-Clustering," the contents of which are incorporated by reference herein for all purposes.

The profiles include the efficient favorite behavior-sorted lists (BList) technologies, which efficiently capture favorite behavior associated with an entity. Data stored within a BList payload include risk-linking features, which allow high-scoring risky entities to influence the scores of other associated entities in near real-time, without computing costly graph-based analytics.

The AML Threat Score can be used in conjunction with rule-based AML systems to prioritize rules-triggered cases, in order to reduce false positives. The AML Threat Score can also be used to directly create cases that have high likelihood of laundering, in order to capture more suspicious activity which is missed by current rules-based systems.

Cloud-based consortium instantiations of the systems and methods described herein help link risky behavior across multiple banks and other institutions, giving a more global view of emerging threats. In particular, new payment channels such as digital currencies (BitCoin, etc.) have particular attraction to money launderers, and cloud-based implementations of the AML Threat Score system address this by monitoring points where digital currencies interact with traditional banking networks and channels.

In some preferred exemplary implementations, for each entity of interest (e.g., customers or accounts), a profile is created. The profile is a data structure which captures statistics of the entity's behavior in an efficient way, without storing the entire record of the past activity. The profile is persisted into a data store, and is retrieved and updated for each input data record (e.g., transaction or non-monetary update). One key to the profiling concept is that the profile does not contain a set of previous records, instead, it uses recursive functions such as exponential decays to compute summary statistics of behavior.

Expected vs actual (long-term vs short-term) behavior is often suggested as an important indicator of money laundering activity. To implement this, values within the profile store long-term and short-term averages of transaction amounts, frequencies of transaction events, and related quantities. This process of combining the input data record with values saved in the profile through mathematical transformations is known "feature construction". Feature construction include time- and event-based averages, e.g., implemented with recursive approximation using exponential decays. Feature construction can also include other types of calculations, such as self-calibrating features (see below), which rely on the use of population properties, which are stored in "global profiles". These global profiles can represent the entire population, or smaller segments such as peer groups.

Another type of feature construction is based on soft-clustering technologies, such as collaborative profiling and recurrent sequence modeling, which also makes use of population or segment properties stored in the global profile. These techniques are designed to extract features of typical behavior, including archetypes and sequence models, which can then be clustered to form estimates of the typical distributions of normal behavior. Clusters are typically created within the entity segmentations used in a domain (e.g., a bank's segmentation of customer based on income, business type, geographic area, KYC threat segments, etc.). Behavior which deviates from typical clusters can be detected by constructing a soft-clustering misalignment (SCM) score from the numerical soft-clustering features. The SCM score and attributes used in the creation of the score can be one of the many features created within the profile-based feature construction module for the AML Threat Score.

The output of the feature construction module is a numerical vector of features, $x_t$, which is fed into the scoring and calibration module (see below).

FIG. 1 shows the components of the feature construction module and their interactions with the profile stores. FIG. 1 illustrates an example of interaction between the profile and feature construction module. Input data $d_t$ from an entity A (e.g., customer or account) is presented to the feature construction module, where it is used to create recursive features, self-calibrating features and soft-clustering features. The output of feature construction is a vector $x_t$ which contains all such features which will be used in later stages of the score creation. Soft-clustering features can be created from methods including collaborative profiling (CP) and recurrent sequence modeling (RSM). Soft-clustering features can be combined to create a soft-clustering misalignment (SCM) score, which indicates if behavior is deviating from the observed typical behavior within clusters found within a segment.

Behavior Sorted Lists

Frequent behavior sorted lists ("BLists") are data structures stored in an entity's profile, and are used to track information in a space-efficient manner. The BList is space-limited, and uses a weighting mechanism to preserve favorite entries in the lists. The weighting mechanism is tuned so that frequently seen favorites are preserved in the list (gated on recency) such that newly seen items can be added, but not at the expensive of deleting long-term often-seen items.

Figure 2:
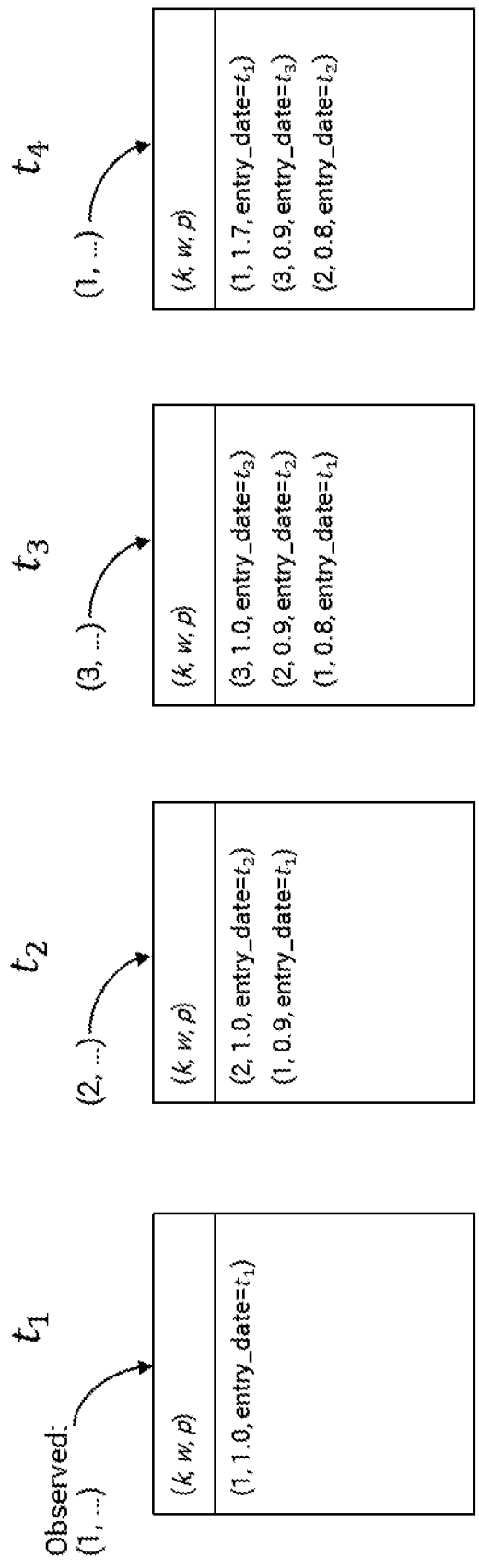
FIG. 2 illustrates operation of a behavior sorted list.

BLists can also store a payload for each entry, which can include similar types of recursive features (see above, Profiling). For an entity A, the BList is a tuple (ordered list) of elements, $(a_1, a_2, \ldots, a_n)$, where n is the maximum allowed size of the BList. Each BList entry $a_i=(k,w,p)$ contains a key k, weight w, and payload p (which typically includes the entry date of the element in the BList). The concept of "favorite" is formalized to mean an entry in the BList which has been on the list for a certain period of time (e.g., entry date >2 weeks in past) and has a certain rank in the list (e.g., in the top half of the list, i<n/2). FIG. 2 show basic BList operation.

FIG. 2: Operation of a BList. At each time step, an observation is considered for addition to the list. At $t_1 \ldots t_3$, a new observation is added to the list, while the weight of existing entries is decayed. New entries are added with weight w=1, and the payload is constructed from the entry date. At $t_4$, the observation has a key=1 that has been seen before. In this case, the weight is updated so that key=1 is now at the top of the list, in the position of "top favorite".

Numerical features can be constructed from the BList. Features can range from basic binary features (e.g., "is element of BList", "is not element of BList", "is favorite element of BList", "is top favorite element of BList") to more complex features ("average weekly rate of missing an element in the BList"). BList "churn" measures how frequently entries drop off the list. For certain entities (e.g., a common entity like an electric utility account), their BLists of associated payer accounts will have higher churn, while a less common entity may have little or no churn.

BList "fingerprinting" can be done by comparing the elements in one BList to those in another, giving a numerical value to the amount of consistency between the entries in both lists. The elements in a BList can be represented as a tuple, and distance metrics can be applied to compare the tuples. To compare BList for an entity $A=(a_1, a_2, \ldots, a_n)$, with BList for entity $B=(b_1, b_2, \ldots, b_a)$, a number of distance metrics can be used, some examples include:

Set similarity distances such as Jaccard distance can be used to compare A and B based on commonality of entries between the two lists. However set similarity metrics do not take into account the ordering of the BList.

Edit distances such as Levenshtein distance can be used, by considered each key k as a letter of a string, and finding the number of edits required to transform the list of A's keys into the list of B's keys, where each edit may be an insertion, deletion or substitution of a key.

Efficient metrics can be computed by taking advantage of key-indexing in a datastore system. Permutations of the BList keys (tuples of various lengths) can be constructed, such as $(k_{a_1},k_{a_2},k_{a_1}),(k_{a_1},k_{a_3},k_{a_2}),(k_{a_2},k_{a_1},k_{a_3}),(k_{a_3},k_{a_1},k_{a_2})$, etc. These permutations are each stored as individual keys in the data store. A match of the top 3 keys $(k_{b_1},k_{b_2},k_{b_1})$ from BList B against these keys would indicate similarity with the BLists stored in data store. This provides quick (with computational complexity order O(1)) method of determining if an entity is showing similar favorite behavior to another entity. Typically, the data store would store a small set of the suspicious/SAR account BList entries, and so it becomes an efficient way of determining similarity to risky entities. Permutations generally contain a small number of keys, from two to five.

We refer to these metrics as "BList fingerprint distances", where the choice of distance metric is informed by the specifics of the application, including the key type and efficiency requirements. The permutation of keys BList fingerprint method described above is fast enough to be performed for real-time decisioning, and essentially makes a space vs. time tradeoff. The set similarity and edit distance BList fingerprints described above can involve substantial computational effort, such that they can be performed in a batch process (e.g. daily) against only a small set of accounts, e.g. those with a known SAR or fraudulent entity.

In AML applications, multiple BLists can be created for each entity, and used to store credited and debited accounts, countries, and usage of access channels and processing channels. Additional numerical features can be constructed on the payload values, e.g., a BList on accounts with a payload that stores the average payment amount. In AML and retail banking applications, BList features help detect shifts in payment and transfer behavior, such as suddenly paying a large number of never-associated accounts.

The BList fingerprint distance can be used a number of ways for AML and fraud prevention. If two accounts, A and B, have very similar BList fingerprints, and A was known to have suspicious activity, and account B began to behave like the first, then we could conclude that B is more likely suspicious and should be investigated. If we preserve account A's profile and BLists, then we can compare new accounts against it, even after account A has been blocked or closed.

Anomaly Detection Using Self-Calibrating Outlier Technology

The numerical features created in the feature construction module may undergo changes in distribution over the time while the system is deployed. Changes in distribution can be due to changes in currency valuation, macroeconomic factors, target customers for the financial institution, and changes in risk patterns due to differing schemes for money laundering. Since these distributional changes cannot be known at design-time, the system applies self-calibrating outlier detection methods to those features that are deemed susceptible to significant changes.

Single-variate outlier detection is done by run-time estimation of parameters of the distribution, such as quantiles, using self-calibrating algorithms. These distribution parameters are stored in a global profile in the data store, which is common for all entities (or all entities within a peer grouping). Once a set of quantiles ($\theta_h$, $\theta_l$, e.g., $90^{th}\%$ and $99^{th}\%$), have been estimated, an outlier feature q is found from a new observation $x_i$:

$$q(x_i) = \min\left(\max\left(\frac{x_i - \theta_s}{\theta_h - \theta_l}, 0\right), C\right) \in [0, C]$$

Where $\theta_s$ is a design parameter, often set to either $q_h$ or $q_l$, and C is used to limit the outlier feature to a certain range.

Creation of the AML Threat Score

Figure 3:
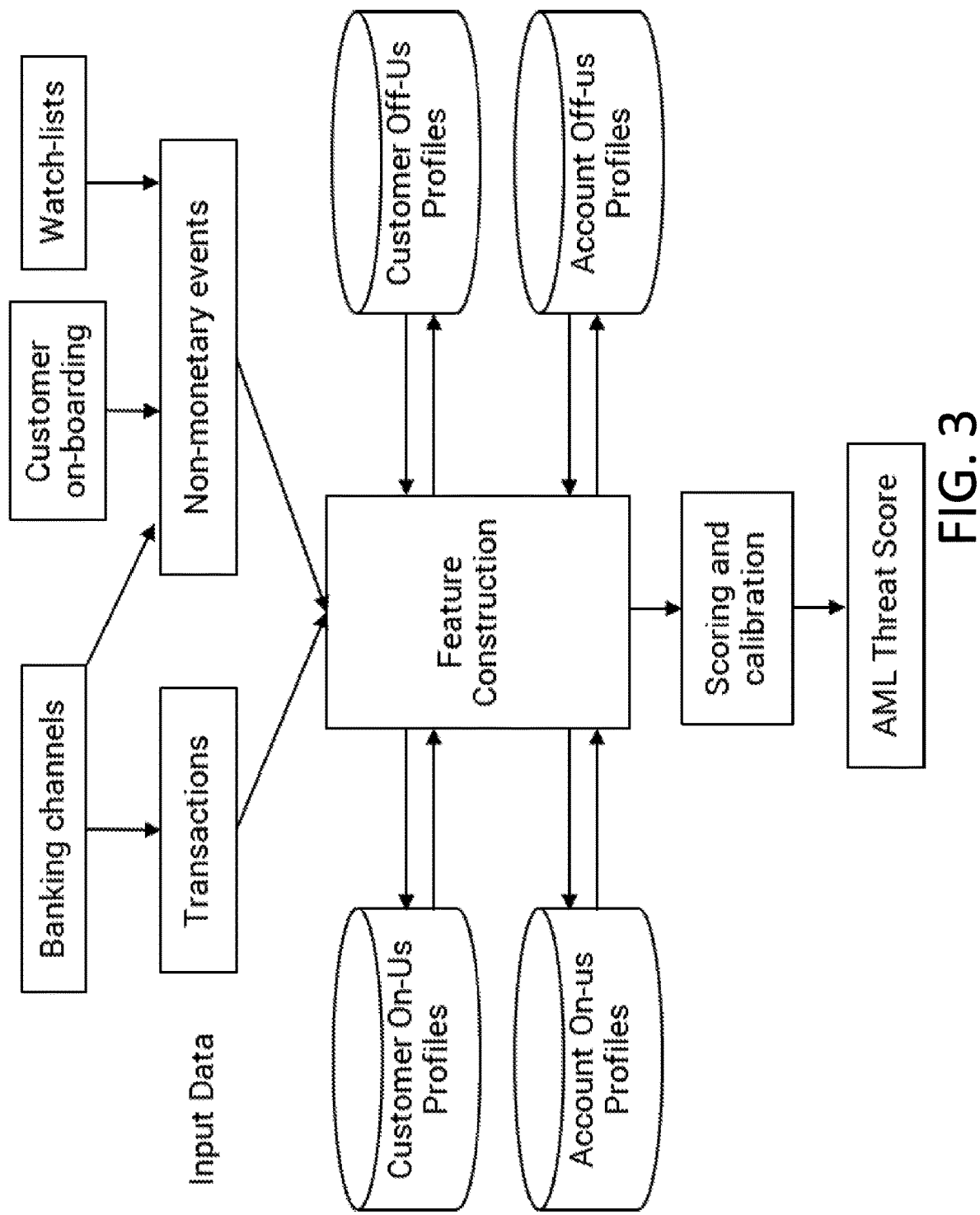
FIG. 3 shows an overview for the AML Threat Score system at run-time.

In some implementations, a software system creates an AML Threat Score based on advanced learning algorithms, including the modules described in the previous sections. Two major sources of data are fused together to create an AML Threat Score at the customer and account levels: transactional and non-monetary information. Transactional data include monetary transfers, payments, debits, etc., and non-monetary data includes customer applications, customer updates, demographic, account update, beneficiary changes, and on-line banking information (page view, login, etc.). FIG. 3 shows an overview of the AML Threat Score system.

FIG. 3: Overview for the AML Threat Score system (run-time). Input data from customer systems and transactions from banking channels are sent in streaming or batch-mode to the feature construction module. The feature construction module converts the input data (of multiple types, such as categorical, ordinal, text), and convert them into numerical features, which are stored and retrieved from profile data stores. Relevant entities to be profiled for AML include customers and accounts. A distinction is made between customers and accounts who have direct relationships with the financial institution (on-us) and those who do not (off-us). Once features are constructed, this numerical vector is converted to the AML Alert Score using the scoring and calibration module.

Regulations require that institutions track details of their customers, which are referred to as Know Your Customer (KYC) rules. KYC information includes:
 a) Identity confirmation, including personal and business information on the nominal and beneficial owners of an account.
 b) Risky countries
 c) Political exposed persons
 d) Watch-lists
 e) Enhanced Due Diligence (EDD) in cases of suspected higher risk, which includes source of wealth/funds, nature of business, the customers of that business, references, etc. Some of this information may be in unstructured plain text.

Traditional processes include vetting this information during on-boarding. The presented system uses on-boarding information, as well as any updates to the KYC information, presented over the lifetime of the customer's relationship with the institution.

For each data record (monetary transaction or non-monetary record), the scoring and calibration module combines the features from the feature construction module and generates an AML Threat Score, which is an integer in [1,999], where low values indicate low probability that the entity state and current record points to money laundering activity, and where high values of the score indicate high probably of laundering activity, as well as similarity with behavior of known past SAR cases.

Financial institutions are required to file SARs, and details from SAR cases are available to the scoring module as a supervised training signal for machine learning algorithms. Supervised learning algorithms used by the scoring module can include one or more of: linear regression, logistic regression, multi-layer perceptron neural networks, scorecards, support-vector machines, adaptive models, and decision trees.

The AML Threat Score system (FIG. 3) is typically run with data from a single institution, and a distinction is made between customers and accounts held at that institution (on-us) and those held at other institutions (off-us). The number of off-us customer and account profiles can get very large, in fact, covering all the customers and accounts at institutions worldwide. Concise profiling technology is used to maintain the profiles of the most relevant off-us entities within the limits of the storage capacity of the AML solution. The most relevant entities are preserved based on a combination of factors: frequency of activity, recent high AML Threat Scores, monetary value of transactions, watch list status, etc. In FIG. 3, the customer and account on-us profiles are sized to store all entities with relationships with the institution, while the off-us profiles are sized based on the trade-off between storage cost and prediction accuracy.

The AML Threat Score system can interface with other AML solutions which produce rule-based alerts. Because some of these alerts did not lead to SARs being filed (false-alarms), this additional information can be used (during design-time) as supervised training signals, with the goal of lowering scores of records which are similar to those false-alarm rule-based alerts.

Because a considerable amount of human effort is involved in investigating a case for potential SAR filing, it is important for the AML Threat System to produce scores which are stable over time, and to have score-bands which represent a consistent likelihood of risk over time. To achieve this, design-time and run-time calibration steps are used to adjust the output of the supervised learning algorithm to produce the final AML Threat Score. Such calibration methods can include on-line distribution estimates. The AML Threat Score can be designed to supplement rules cases by prioritizing those rules-generated cases to work first. Additionally, when no AML rules have fired, the AML Threat Score can be used independently to generate SAR investigations and work cases.

Efficient Account Risk-Linking

Layering of funds is typically an integral part of the laundering process. If an account interacts with other accounts known or suspected of laundering, this increases the risk of illicit activity, and that account should be flagged as suspicious. While tree-based link analysis can be performed, we propose a fast and efficient way of linking accounts through behavior-sorted lists within profiles.

Building on the account profiling, BLists and AML Threat Score discussed above, each account profile stores 4 relevant items, which comprise the "risk-linking" features:
  a) HighestScoreRecent—Account's highest score (decayed over time).
  b) HighestLinkedScoreRecent—The highest-scoring of any associated account (decayed over time). This allows linking of risk across multiple accounts (not just accounts that transact directly).
  c) BList: Credited Accounts—List of accounts that this account has transferred funds to (including their highscores).
  d) BList: Debited Accounts—List of accounts that this account has received funds from (including their highscores).

Figure 4:
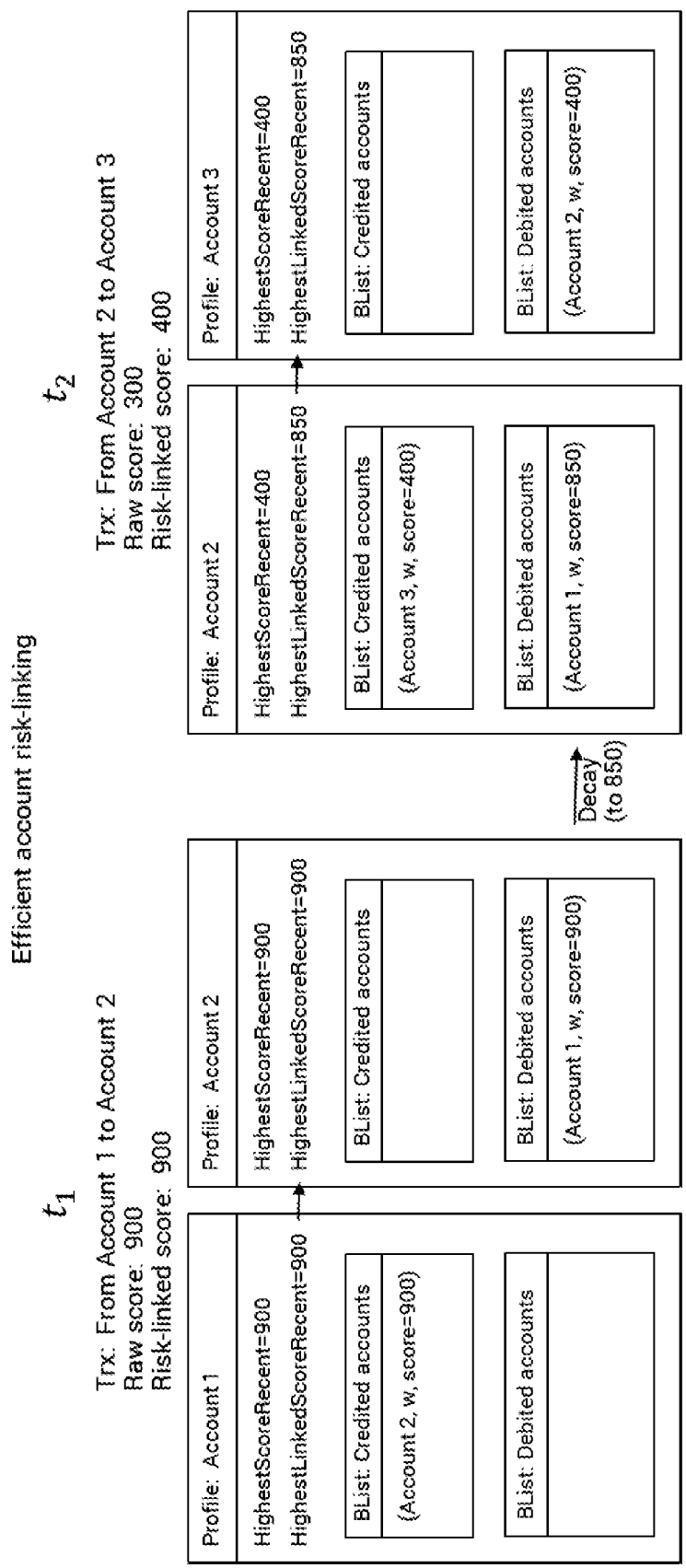
FIG. 4 illustrates an example of efficient account risk-linking.

FIG. 4 shows an example of these elements for a set of transactions. The key processes in the risk-linking are (1) the storing of the score in the profiles of both parties to a transactions, and (2) in the scoring and calibration module (see FIG. 3), using the risk-linking features to create a "risk-linked score", which is merged from the raw score. The feature creation module (see FIG. 3) is responsible for decaying the risk-linked features (scores), and a number of decay strategies are possible:
  a) Event-averaged decay, where the scores are decayed based on the number of events that have occurred since the high-scoring event.
  b) Time-based decay, where the scores are decayed based on the time between the current event and the earlier high-scoring event.
  c) Time-to-live decay, where the scores are preserved (unaltered) for a certain number time-period.

FIG. 4: Example of efficient account risk-linking. In this example, account 1 makes a risky transfer of funds to account 2, which scores 900. That high score is stored in account 1's profile as well as in account 2's profile in "BList: Debited Accounts". The profile of account 2 is also updated with HighestLinkedScoreRecent. Note that this first transaction has the same value for the raw score as the risk-linked score, because no prior risk-linking information was available. Then at $t_2$, account 2 transfers funds to account 3.

While the transaction from account 2 to account 3 would appear less risky in isolation (having a raw score of 300), this transaction and Account 3 can be informed of the linked risk, through 3 features in Account 2 (HighestScoreRecent, "BList: Debited Accounts" and HighestLinkedScoreRecent). The arrows show the risk-linking from account 1 to accounts 2 and 3. The risk-linked score is created by merging the raw score with the scores from the risk-linking features.

Autonomous Retraining of AML Threat Scores

As entities are investigated based on their AML Threat Scores, new SARs are created. The transactions associated with these scores can be rapidly integrated back into the model to improve detection of similar cases. This section describes the feedback loop which autonomously retrains the AML Threat Score at a faster cadence than possible with manual retraining.

The auto-retraining module is important to optimize human investigation time to prevent having to work cases that are very similar to those already deemed false positives and essential when updating BList tuple tables of risky fingerprints associated with known or suspected SAR cases.

The auto-retraining module (FIG. 5) is run periodically to update the model design parameters (including network weights, calibration and soft-clustering parameters), and BList fingerprint tables, e.g., on a weekly or monthly cadence. To keep training times short, the parameters updated are limited to those in the scoring and calibration module, and, in certain variations of the system, the collaborative profile archetypes and associated clusterings. To keep the data set sized manageable, the number of non-SAR cases is downsampled. The scoring mechanism retrained by the auto-retraining module can include one or more of: linear regression, logistic regression, multi-layer perceptron neural networks, scorecards, support-vector machines, adaptive models, and decision trees.

A key component of the auto-retraining module is the quality assurance process (diamond box in FIG. 5), which determines if the automatically learned model parameters are acceptable, or if it is safer and more accurate to use the previously learned model. Generally, the newly trained model may be considered a "challenger" to the previously learned "champion" model, and the challenger model would need to perform better on a suitable validation data set (e.g., from accounts that had not been used in either retraining process, or that came from a different period of time). Multiple challenger models can be created under varying training conditions, such as different regularization parameters and model architectures. For each specific algorithm, other quality checks are performed. For logistic regression or neural network models, the numerical stability of the solution can be evaluated, and can be rejected if the coefficient values have, e.g., high variance (indicating the model is overly sensitive to certain input features).

Figure 5:
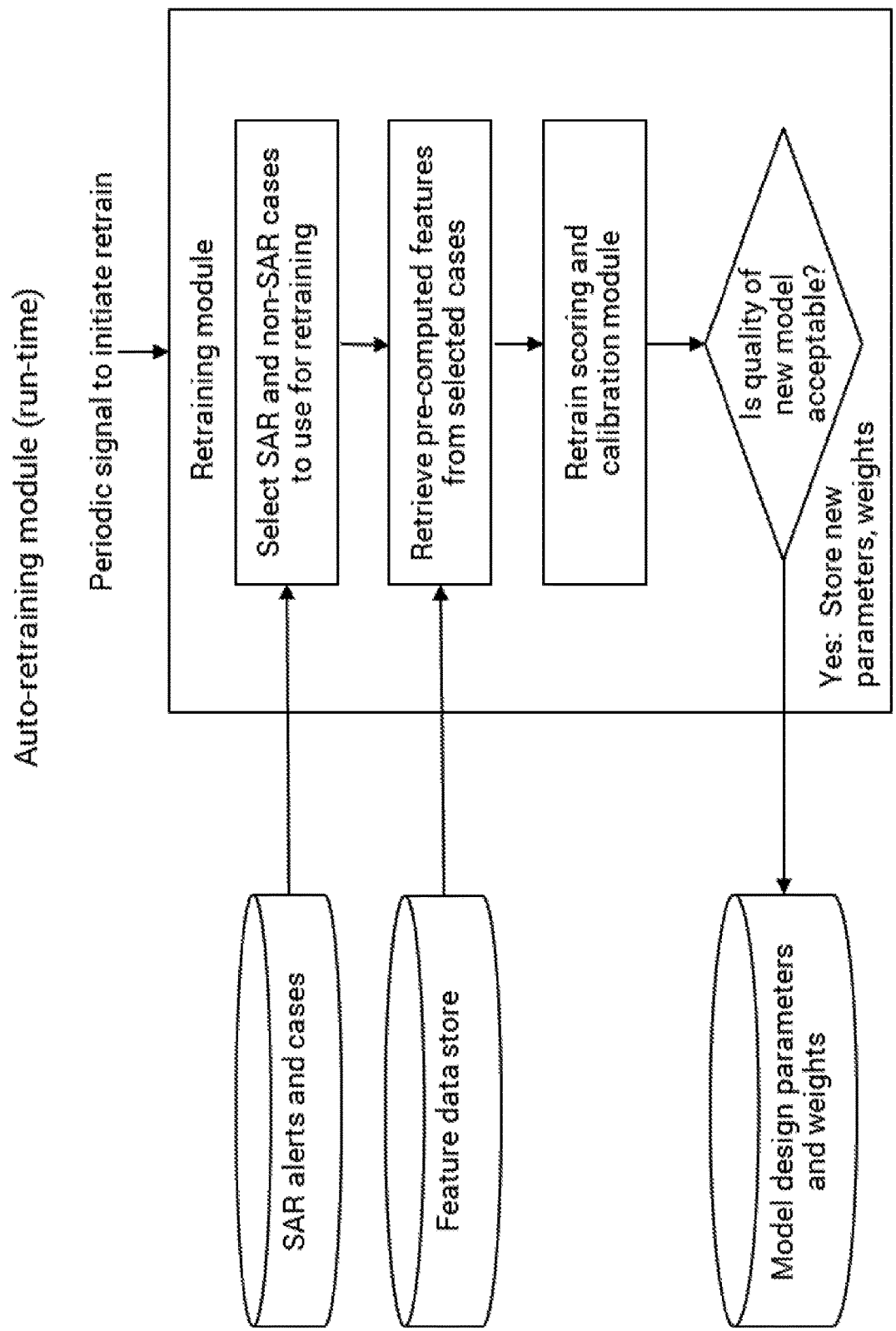
FIG. 5 illustrates an auto-retraining module.

FIG. 5 illustrates an auto-retraining module for automatically updating the scoring and calibration module during system operation (run-time). Periodically, a signal initiates the retraining process. SAR alerts and cases covering a recent time-period are retrieved from a data store, and selected based on applicability for use in retraining. The relevant features associated with those cases are retrieved from the feature data store.

Cloud Based Consortium Model for AML

To fully address the problem of money laundering, the flow of funds must be tracked across multiple financial institutions. The AML Threat Score solution can be deployed in the cloud, which is a set of servers. This allows the predictive model to have access to SAR information and other risk factors from a variety of institutions that are members of the AML Consortium. The predictive model can therefore have access to a wider view of risk information than would be possible when viewing only transactions and customer information from a single institution. For example, in the cloud-based consortium, the efficient-risk linking (see above) can propagate risk information from accounts at multiple banks, which is not possible for an on-premises deployment where the profiles only have a view into transactions where one of the counter-parties is a customer of that institution. When SARs are submitted to the consortium, the associated BList fingerprints are also contributed, such that AML Threat Scores for all associated institutions can be informed of detected suspicious activity.

Because emerging payment systems such as mobile and cryptocurrencies may have limited interaction with traditional financial institutions, there are more limited opportunities to detect laundering which involves them.

To improve detection, a Cloud based data store integrates information from multiple sources, including:
  a) Entities associated with legal and illicit BitCoin exchanges
  b) Entities associated with mobile payment and remittance networks KYC on-boarding and customer updates can include questions on such topics, as well as from public records and regulators. While it may be difficult to get timely information on illicit Bitcoin sources, it is important to collect and centralize information on legal exchanges and administrators (miners, etc.). Regulations now require that certain entities associated with BitCoin be classified as "money services businesses" (MSBs) and must comply with appropriate regulations, such as the Bank Secrecy Act. In particular, if an entity exchanges virtual currencies for real currencies, or acts as an intermediary transferring virtual currency, the entity is treated as a MSB. In some cases BitCoin miners may not be treated as MSBs, e.g., if they only mine BitCoin and use it for personal purchases (without exchange to real currency). The information required for compliance with these regulations is an important part of the data specification, which allows the profiles, BLists, and other features of the system to properly evaluate BitCoin-related accounts and customers. Having information on legal Bitcoin operators helps the AML Threat Score learn their behavior, and detect changes in their behavior that may signal new illicit use (without explicit knowledge of the operator).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   creating one or more profiles for an entity of interest, at least one profile for the entity of interest comprising a data structure that captures exponentially decayed summary statistics of the entity's behavior, the profile further comprising a plurality of behavior sorted lists, a first behavior sorted list associated with the profile of the entity of interest, the first behavior sorted list being formed of an ordered list of entries, at least one entry having a key, a weight, and a payload that represents a frequently-observed behavior of the entity;

generating a set of global profiles associated with one or more entities of interest;

storing the one or more profiles and the set of global profiles in a data store;

for an input data record associated with the entity of interest, retrieving one or more relevant profiles from the data store and updating the one or more relevant profiles to recursively compute summary statistics of behavior of the entity by adding or updating an observed behavior represented by the input data record to at least one of the plurality of behavior sorted lists with a full weight while decaying the weights of existing observed behaviors;

comparing the entries in the first behavior sorted list and at least a second behavior sorted list from among the plurality of sorted lists to generate a numerical value representing a consistency between entries in the first behavior sorted list and behavior sorted lists for other entities, including risky entities;

executing one or more distance models to the plurality of behavior sorted lists to determine a variation of the consistency between the entries in the at least two behavior sorted lists according to the numerical value;

determining, based on the set of global profiles, that the input data record deviates from observed typical behavior within clusters found within a segment generated based on soft-clustering features that provide at least an estimate of typical distributions of normal behavior for segmentations of the entity of interest;

generating an anti-money laundering threat score utilizing one or more trained self-calibrating outlier models based on entity recursively summarized profile behavior, the anti-money laundering threat score representing a threat risk that the entity of interest is engaged in money laundering, the generated threat score for the entity of interest being associated with a linked entity of interest to calculate a risk-linked score for the linked entity;

retraining the one or more self-calibrating outlier models, in response to determining a degradation of a set of anti-money laundering threat scores, the retraining being based on the degradation and using one or more auto-retraining mechanisms executed by one or more processors; and generating a signal to issue an alert based on the anti-money laundering threat score.

2. The method in accordance with claim 1, wherein the first behavior sorted list includes frequently seen favorite activities associated with the entity of interest, and the first behavior sorted list is updated to preserve frequently seen favorite activities based on recency and preserving long-term often-seen activities.

3. The method in accordance with claim 2, wherein the recency is determined based on a date in the payload indicating when the respective entry was entered in the first behavior sorted list.

4. The method in accordance with claim 1, wherein the input data record is a transaction performed by the entity of interest.

5. The method in accordance with claim 1, wherein storing the one or more profiles in a data store further comprises storing the one or more profiles as an account on a server that is part of a cloud-based network of servers.

6. The method in accordance with claim 5, wherein the method further comprises linking, by the one or more computer processors, two or more accounts from the cloud-based network of servers, wherein the risk level associated with the linkage of accounts is reflected using the threat scores across the linked list of accounts.

7. The method in accordance with claim 1, wherein the risk-linked score in addition to a threat score generated for the linked entity of interest is utilized to determine risk of illicit activity for the linked entity of interest.

8. A non-transitory computer program product storing instructions that, when executed by at least one programmable processor, cause the at least one programmable processor to perform operations comprising:

creating one or more profiles for an entity of interest, at least one profile for the entity of interest comprising a data structure that captures summary statistics of the entity's behavior, the profile further comprising a plurality of behavior sorted lists, a first behavior sorted list associated with the profile of the entity of interest, the first behavior sorted list being formed of an ordered list of entries, at least one entry having a key, a weight, and a payload that represents a frequently-observed behavior of the entity;

generating a set of global profiles;

storing the one or more profiles and the set of global profiles in a data store;

retrieving one or more relevant profiles from the data store and updating the one or more relevant profiles to recursively compute summary statistics of behavior of the entity by adding or updating an observed behavior represented by the input data record to at least one of the plurality of behavior sorted lists with a weight;

comparing the entries in the first behavior sorted list and at least a second behavior sorted list from among the plurality of sorted lists to generate a numerical value representing a consistency between entries in the first behavior sorted list and a second behavior sorted list for a second entity;

executing one or more distance models to the plurality of behavior sorted lists to determine a variation of the consistency between the entries in the first and second behavior sorted lists according to the numerical value;

determining, based on the set of global profiles, that the input data record deviates from observed typical behavior within clusters found within a segment generated based on soft-clustering features that provide at least an estimate of typical distributions of normal behavior for segmentations of the entity of interest; and generating a threat score utilizing one or more trained self-calibrating outlier models based on entity recursively summarized profile behavior, the generated threat score for the entity of interest being associated with a linked entity of interest to calculate a risk-linked score for the linked entity, the association between the entity of interest and the linked entity of interest being such that a high-scoring linked entity of interest influences the threat score generated for the entity of interest in real-time;

retraining the one or more self-calibrating outlier models, in response to determining a degradation of a set of anti-money laundering threat scores, the retraining being based on the degradation and using one or more auto-retraining mechanisms executed by one or more processors.

9. The non-transitory computer program product in accordance with claim 8, wherein the payload of at least one entry of the one or more profiles includes recursive features and at least a first behavior sorted list includes frequently seen favorite activities associated with the entity of interest, and the first behavior sorted list is updated to preserve frequently seen favorite activities based on recency.

10. The non-transitory computer program product in accordance with claim 8, wherein a date is included in the payload indicating when the respective entry was entered in the first behavior sorted list.

11. The non-transitory computer program product in accordance with claim 8, wherein the input data record is a transaction performed by the entity of interest.

12. The non-transitory computer program product in accordance with claim 8, wherein storing the one or more profiles in a data store further comprises storing the one or more profiles as an account on a server that is part of a cloud-based network of servers.

13. The non-transitory computer program product in accordance with claim 12, wherein the operations further comprise linking, by the one or more computer processors, two or more accounts from the cloud-based network of servers, wherein the risk level associated with the linkage of accounts is reflected using the threat scores across the linked list of accounts.

14. The non-transitory computer program product in accordance with claim 8, wherein the risk-linked score in addition to a threat score generated for the linked entity of interest is utilized to determine risk of illicit activity for the linked entity of interest.

15. A system comprising:
at least one programmable processor; and,
a machine-readable medium storing instructions that, when executed by the at least one processor, cause the at least one programmable processor to perform operations comprising:
creating one or more profiles for an entity of interest, at least one profile for the entity of interest comprising a data structure that captures summary statistics of the entity's behavior, the profile further comprising a plurality of behavior sorted lists, a first behavior sorted list associated with the profile of the entity of interest, the first behavior sorted list being formed of an ordered list of entries, at least one entry having a key, a weight, and a payload that represents a frequently-observed behavior of the entity;
generating a set of global profiles;
storing the one or more profiles and the set of global profiles in a data store;
for an input data record associated with the entity of interest, retrieving one or more relevant profiles from the data store and updating the one or more relevant profiles to recursively compute summary statistics of behavior of the entity by adding or updating an observed behavior represented by the input data record to at least one of the plurality of behavior sorted lists with a full weight while decaying the weights of existing observed behaviors;
comparing the entries in the first behavior sorted list and at least a second behavior sorted list from among the plurality of sorted lists to generate a numerical value representing a consistency between entries in the first behavior sorted list and behavior sorted lists for other entities, including risky entities;
executing one or more distance models to the plurality of behavior sorted lists to determine a variation of the consistency between the entries in the at least two behavior sorted lists according to the numerical value;
determining, based on the set of global profiles, that the input data record deviates from observed typical behavior within clusters found within a segment generated based on soft-clustering features that provide at least an estimate of typical distributions of normal behavior for segmentations of the entity of interest; and
generating an anti-money laundering threat score utilizing one or more trained self-calibrating outlier models, the generated threat score for the entity of interest being associated with a linked entity of interest to calculate a risk-linked score for the linked entity, the association between the entity of interest and the linked entity of interest being such that a high-scoring linked entity of interest influences the threat score generated for the entity of interest;
retraining the one or more self-calibrating outlier models, in response to determining a degradation of a set of anti-money laundering threat scores, the retraining being based on the degradation and using one or more auto-retraining mechanisms executed by one or more processors.

16. The system in accordance with claim 15, wherein the self-calibrating outlier models are based on entity recursively summarized profile behavior, the payload of at least one entry of the one or more profiles including recursive features and at least a first behavior sorted list including frequently seen favorite activities associated with the entity of interest, and the first behavior sorted list updated to preserve frequently seen favorite activities based on recency.

17. The system in accordance with claim 15, wherein the payload of at least one entry of the one or more profiles include archetype distributions, derived archetype profile features, and soft clustering misalignment scores.

18. The system in accordance with claim 15, wherein the input data record is a transaction performed by the entity of interest.

19. The system in accordance with claim 15, wherein storing the one or more profiles in a data store further comprises storing the one or more profiles as an account on a server that is part of a cloud-based network of servers.

20. The system in accordance with claim 19, wherein the operations further comprise linking, by the one or more computer processors, two or more accounts from the cloud-based network of servers, wherein the risk level associated with the linkage of accounts is reflected using the threat scores across the linked list of accounts.

21. The system in accordance with claim 15, wherein the risk-linked score in addition to a threat score generated for the linked entity of interest is utilized to determine risk of illicit activity for the linked entity of interest.

22. The system in accordance with claim 15, wherein the association between the entity of interest and the linked entity of interest being such that a high-scoring linked entity of interest influences the threat score generated for the entity of interest.

23. The system in accordance with claim 15, wherein the high-scoring linked entity of interest influences the threat score generated for the entity of interest in real-time without need for computing costly graph-based analytics.

* * * * *